Nov. 1, 1955
M. FRANCOIS
2,722,301
RELEASABLE FRICTION CLUTCH WITH ADJUSTABLE
MAXIMUM TORQUE CAPACITY
Filed May 8, 1951
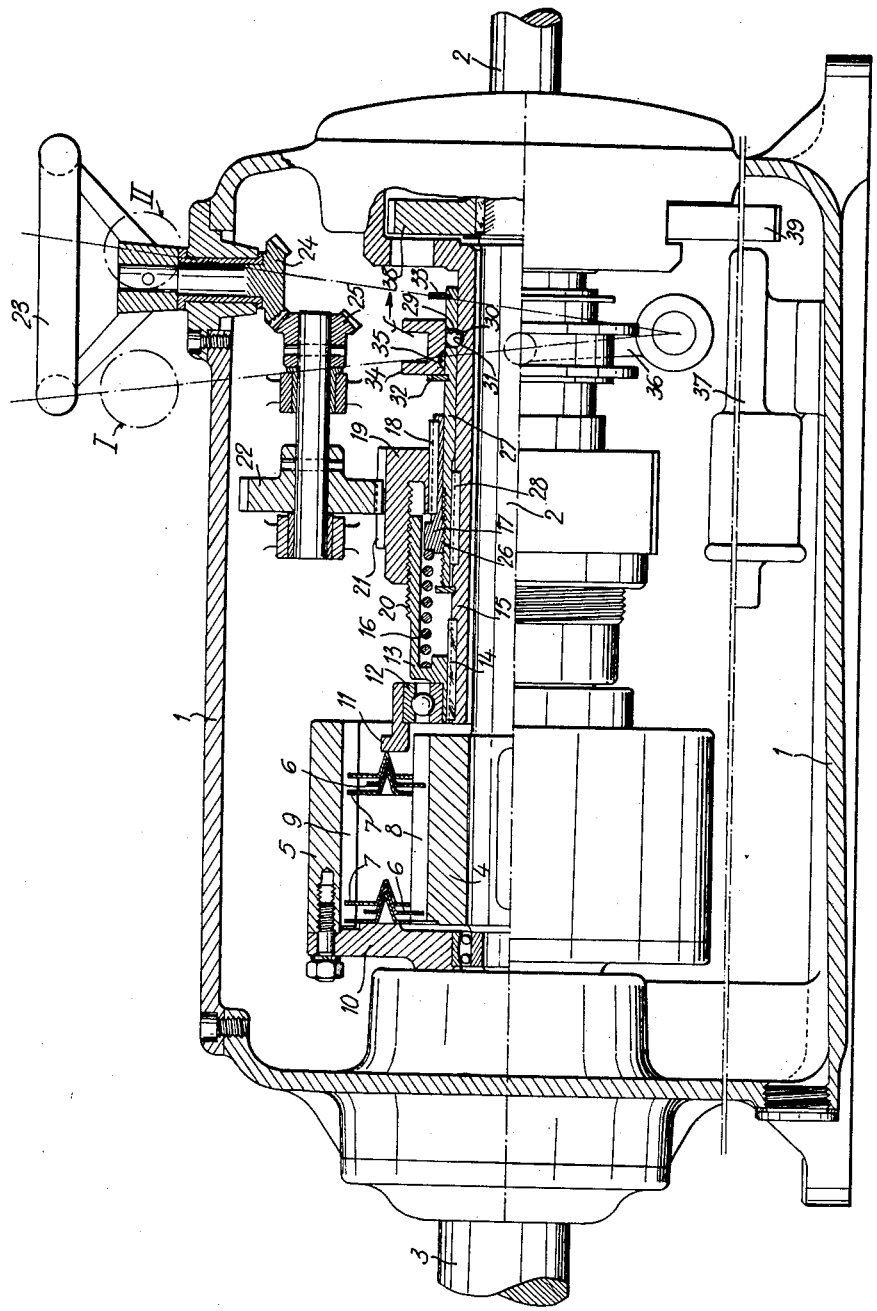
MAURICE FRANCOIS
INVENTOR
By Richardson, Davdani Nordon
his ATTYs.

United States Patent Office 2,722,301
Patented Nov. 1, 1955

2,722,301

RELEASABLE FRICTION CLUTCH WITH ADJUSTABLE MAXIMUM TORQUE CAPACITY

Maurice François, Courbevoie, France, assignor to Etablissements Collins & Tourmadre, Courbevoie, France, a corporation of France Application May 8, 1951, Serial No. 225,178

Claims priority, application France May 13, 1950

10 Claims. (Cl. 192—82)

The present invention pertains to friction clutches having an adjustable torque capacity, and more particularly to slip clutches of this character used for speed control and which are interposed between a constant speed driving shaft and a driven shaft revolving at a speed which changes at a constant rate.

The principal object of the invention is to provide an improved friction clutch of the kind used when the driven shaft supports or drives a winding device such as a reel, core, mandrel or the like upon which is wound a thread-like, wire, ribbon or sheet material under a constant winding tension. In such a device the diameter of the wound part gradually increases, the peripheral speed tends to increase in the same way and, in order to keep said speed constant, it is necessary to decrease progressively the rotational speed of the driven shaft.

In presently known devices of this character, all of which are controlled by an adjustable pressure applied to interengaging friction members interposed between the driving and driven shafts, present the two following inherent disadvantages: during the operation of the machine the friction members become overheated and wear away unduly rapidly, especially where high speeds, such as those used in paper rolling machines are concerned; further, these devices do not comprise any means for rapid disengagement of the clutch.

The invention provides an adjustable spring pressed thrust unit which is axially movable with respect to one of the shafts either to apply an adjustable pressure to interengaging friction members or to release the pressure between the friction members, together with locking means for selectively holding the thrust unit in either position.

According to another feature of the invention, the friction members comprise a plurality of interleaved circular metal discs having interengaging annular ridges formed therein, one set of discs being axially slidably carried by a member fixed to the driven shaft and the other set being axially slidably carried by another member fixed to the driving shaft, the entire disc assembly being enclosed in an oil filled housing so that the rotating friction discs are continuously immersed in a bath of oil.

Other objects and advantages will become apparent upon reading the following specification together with the accompanying drawing forming a part hereof.

In the drawing, the single figure is a view in side elevation of an embodiment of the invention, partly in section and partly broken away to show details of construction.

Referring to the drawing, the device comprises an elongated oiltight housing 1 having a driving shaft 2 journaled in one end thereof and a driven shaft 3 journalled in its opposite end, the driving shaft 2 and the driven shaft 3 being coaxially aligned and positioned with their free ends in mutually supporting lateral engagement with each other through an interposed ball bearing of suitable construction. A driving collar 4 is fixed to the drive shaft 2 and a hollow cylindrical driven drum 5 is fixed to the driven shaft 3. Two sets of interleaved metal friction discs 6 and 7 are shown with mutually engageable annular ridges of V-shaped cross-section formed therein. The discs 6 of the driving set are individually splined to the driving collar 4 by the splines 8. The discs 7 of the driven set are interleaved with the discs 6 of the driving set, the discs 7 being axially slidable along the radially inwardly projecting splines 9 on the inner surface of the driven drum 5. A compression collar 11 carried by the outer race of a ball bearing 12 bears against the apex of the annular V-shaped ridge of the outermost friction disc. The inner race of ball bearing 12 is supported by an axially slidable non-rotating cup member 13 which forms a part of an adjustable spring pressed thrust unit as hereinafter described. The cup member 13 is slidably keyed at 14 to a fixed stationary sleeve 15 which surrounds the drive shaft 2, the sleeve 15 being secured to one end of the housing 1.

A helical compression spring 16 is disposed within the cup member 13. One end of compression spring 16 bears against the closed end of cup member 13 adjacent to the ball bearing 12. The other end of spring 16 bears against a cylindrical pressure adjusting nut 17 splined at 18 to a further externally toothed nut 19. Toothed nut 19 is in threaded engagement with external threads 20 formed on the non-rotating cup member 13. Nut 19 is provided with wide faced teeth 21 which are axially slidable while in meshing engagement with a pinion 22. Pinion 22 may be rotated by turning an external hand wheel 23 through the action of gearing comprising bevel gears 24 and 25.

The pressure adjusting nut 17 engages external threads 26 formed on a non-rotating axially slidable sleeve 27 splined at 28 to the stationary sleeve 15. The pitch of the threads 26 on slidable sleeve 27 is in this embodiment of the invention the same as the pitch of the threads 20 on cup member 13 and that of the two nuts 17 and 19.

The non-rotating slidable sleeve 27 has three radial holes 29 spaced 120° apart which are formed therein near its right hand end as viewed in the drawing, these holes 29 passing through the wall of the slidable sleeve. Disposed in each of the holes 29 is a ball 30, the upper ball being shown in the drawing with its lower portion engaging a shallow external annular groove, or recess 31 of arcuate cross-section formed in the outer surface of the stationary sleeve 15.

Axially spaced stop collars 32 and 33 are mounted on slidable sleeve 27 and limit the axial movement therebetween of a slidable externally grooved collar 34 mounted on the slidable sleeve 27. Collar 34 has a shallow annular groove or recess 35 of arcuate cross-section formed on its inner surface. The external groove of collar 34 is engaged by a fork 36 which is angularly movable by displacement of a manually operable clutch release lever (not shown) between limiting positions I and II.

The entire housing 1 is filled with oil, continuously circulated by a pump 37, driven by means of shaft 2 through pinions 38 and 39, the circulatory system including a cooler not shown.

The clutch operates in the following manner:

The lever 36 being in position I corresponding to the position of collar 34 shown in the drawing, slidable sleeve 27 is locked by balls 30 on stationary sleeve 15 and the device is in the engaged position. The brake-torque created by the friction discs 6 and 7 is regulated by operating hand wheel 23 to compress or release spring 16. Rotation of hand-wheel 23 causes a corresponding rotation of pinion 22 and nuts 19 and 17, these two nuts turning together and simultaneously screwing or unscrewing by the same amount on cup member 13 and locked slidable sleeve 27 respectively. The pressure exerted by spring 16 on discs 6 and 7 is thus regulated by the forward or backward movement of nut 17 on locked slidable sleeve 27 and is applied to ball bearing 12 by the assembly of the threadedly engaged cup member 13 and nut 19 which may slide freely relative to nut 17 along the sliding keyways 18 and 14 of the splined connections and the wide faced gear teeth 21 on nut 19.

The constant maximum clutch-torque between the driving shaft 2 and the driven shaft 3 for the required winding speed is adjustably determined in this manner.

If for any reason it is required to release suddenly the pressure of spring 16 on discs 6 and 7, the clutch release lever is merely brought to position II: fork 36 causes collar 34 to move in direction $f$ and brings internal groove 35 of collar 34 opposite balls 30. The balls 30 on the under side fall, under the force of gravity, into groove 35 and lock slidable sleeve 27 to fork 34 and, under the combined action of the lateral pressure exerted by slidable sleeve 27 in direction $f$ and the shallow arcuate cross-sectional shape of groove 31, the upper ball 30 also moves upwardly out of groove 31 and enters the internal groove 35 of collar 34. Thereafter, spring 16 forces nut 17 into engagement with an abutting shoulder portion of nut 19, and the entire thrust unit comprising the compression collar 11, ball bearing 12, cup member 13, compression spring 16, nuts 17 and 19, and slidable sleeve 27, moves to the right in direction $f$ along with collar 34. Thus, all pressure on the interleaved friction discs 6 and 7 is relieved.

Having now described my invention what I claim as new and desire to secure by Letters Patent is:

1. Clutch with adjustable torque capacity of the type comprising interengaging friction means interposed between a constant speed driving shaft and a driven shaft turning at a speed varying at a constant rate, which comprises a housing supporting the driving shaft and the driven shaft, a fixed sleeve in said housing, a thrust unit acting on said friction means and slidably keyed on said fixed sleeve, clutch release means for controlling the movement of said thrust unit, and selectively operable locking means for locking said thrust unit either to said fixed sleeve or to said clutch release means, said thrust unit comprising a sleeve slidably disposed on said fixed sleeve and movable by said clutch release means, a slidable member slidable along said fixed sleeve, compression spring means interposed between said slidable member and said slidable sleeve and capable of yieldably urging the latter and the slidable member apart, a device for adjusting the thrust exerted by said compression spring means, and means movable with said slidable member for applying the pressure of said compression spring means to said friction means, said slidable sleeve being locked by said locking means.

2. A clutch of the class described, comprising: in combination with a housing, a driving shaft journaled in said housing, a driven shaft journaled in said housing, and interengaging torque limiting friction means connecting said driven shaft to said driving shaft, the maximum torque transmissable between said shafts being determined by the pressure of interengagement of said friction means, the provision of: a fixed sleeve surrounding one of said shafts; an adjustable thrust unit axially movable along said sleeve and engageable with said friction means for varying the pressure of interengagement thereof; clutch release means for moving said thrust unit; and selectively operable locking means for locking said thrust unit either in engagement with said fixed sleeve for applying pressure to said friction means or in engagement with said clutch release means for releasing said pressure; said thrust unit comprising: a non-rotating sleeve slidably disposed on said fixed sleeve and movable by said clutch release means; a pressure adjusting nut threaded on said slidable sleeve; a non-rotating cup member slidable along said fixed sleeve; compression spring means engaging said cup member and said pressure adjusting nut; a further nut splined to said pressure adjusting nut for rotation therewith and limited movement therealong, said further nut threadedly engaging said cup member; and means movable with said cup member for applying the pressure of said compression spring means to said friction means, said slidable sleeve being locked by said locking means and said pressure being adjustable by rotation of said further nut.

3. A clutch of the class described, comprising: in combination with a housing, a driving shaft journaled in said housing, a driven shaft journaled in said housing, and interengaging torque limiting friction means connecting said driven shaft to said driving shaft, the maximum torque transmissable between said shafts being determined by the pressure of interengagement of said friction means, the provision of: a fixed sleeve surrounding one of said shafts; an adjustable thrust unit axially movable along said sleeve and engageable with said friction means for varying the pressure of interengagement thereof; clutch release means for moving said thrust unit; and selectively operable locking means for locking said thrust unit either in engagement with said fixed sleeve for applying pressure to said friction means or in engagement with said clutch release means for releasing said pressure; said thrust unit comprising: a non-rotating sleeve slidably disposed on said fixed sleeve and movable by said clutch release means; a pressure adjusting nut threaded on said slidable sleeve; a non-rotating cup member slidable along said fixed sleeve; compression spring means engaging said cup member and said pressure adjusting nut; a further nut splined to said pressure adjusting nut for rotation therewith and limited movement therealong, said further nut threadedly engaging said cup member, the thread pitches of said two nuts being equal; and means movable with said cup member for applying the pressure of said compression spring means to said friction means, said slidable sleeve being locked by said locking means and said pressure being adjustable by rotation of said further nut.

4. A clutch of the class described, comprising: in combination with a housing, a driving shaft journaled in said housing, a driven shaft journaled in said housing, and interengaging torque limiting friction means connecting said driven shaft to said driving shaft, the maximum torque transmissable between said shafts being determined by the pressure of interengagement of said friction means, the provision of: a fixed sleeve surrounding one of said shafts; an adjustable thrust unit axially movable along said sleeve and engageable with said friction means for varying the pressure of interengagement thereof; clutch release means for moving said thrust unit; selectively operable locking means for locking said thrust unit either in engagement with said fixed sleeve for applying pressure to said friction means or in engagement with said clutch release means for releasing said pressure; said thrust unit comprising: a non-rotating sleeve slidably disposed on said fixed sleeve and movable by said clutch release means, a pressure adjusting nut threaded on said slidable sleeve; a non-rotating cup member slidable along said fixed sleeve; compression spring means engaging said cup member and said pressure adjusting nut; a further nut splined to said pressure adjusting nut for rotation therewith and limited movement therealong, said further nut threadedly engaging said cup member, the thread pitches of said two nuts being equal; means movable with said cup member for applying the pressure of said compression spring means to said friction means, said slidable sleeve being locked by said locking means and said pressure being adjustable by rotation of said further nut; said further nut having wide faced gear teeth formed thereon, said clutch further comprising a pinion supported by said housing and axially slidably meshing with said teeth, and means for rotating said pinion for adjustment of said pressure.

5. A clutch according to claim 2, wherein said slidable sleeve has a radial through aperture formed therein, said fixed sleeve has a shallow external recess formed therein, said clutch release means comprises a collar axially slidable on said slidable sleeve and having a shallow internal recess formed therein, and in which said locking means comprises a ball radially movable in said aperture, the diameter of said ball being sufficiently large for simultaneous locking engagement with a selected one of said recesses and said aperture and sufficiently small to prevent simultaneous engagement with both of said apertures.

6. A clutch according to claim 2, wherein said friction means comprises a first set of axially movable concentric discs connected to said driving shaft for rotation therewith and a second set of axially movable concentric discs connected to said driven shaft for rotation therewith, said two shafts being coaxially aligned and said discs being interleaved with respect to each other, said thrust unit being coaxial with said shafts and said discs.

7. A clutch according to claim 6, in which said discs have mutually engageable annular ridges formed therein.

8. A clutch according to claim 2, in which said housing is filled with oil which penetrates said interengaging friction means, said clutch further comprising pump means driven by one of said shafts for circulating said oil.

9. A clutch of the class described, comprising: in combination with a housing, a driving shaft journaled in said housing, a driven shaft journaled in said housing, and interengaging torque limiting friction means connecting said driven shaft to said driving shaft, the maximum torque transmissable between said shafts being determined by the pressure of interengagement of said friction means, the provision of: a fixed sleeve surrounding one of said shafts; an adjustable thrust unit axially movable along said sleeve and engageable with said friction means for varying the pressure of interengagement thereof; clutch release means for moving said thrust unit; selectively operable locking means for locking said thrust unit either in engagement with said fixed sleeve for applying pressure to said friction means or in engagement with said clutch release means for releasing said pressure; said thrust unit comprising: a non-rotating sleeve slidably disposed on said fixed sleeve and movable by said clutch release means; a pressure adjusting nut threaded on said slidable sleeve; a non-rotating cup member slidable along said fixed sleeve; compression spring means engaging said cup member and said pressure adjusting nut; a further nut splined to said pressure adjusting nut for rotation therewith and limited movement therealong, said further nut threadedly engaging said cup member; means movable with said cup member for applying the pressure of said compression spring means to said friction means, said slidable sleeve being locked by said locking means and said pressure being adjustable by rotation of said further nut; and control means operatively connected with said further nut for rotating the latter and thereby adjusting said pressure.

10. A clutch of the class described, comprising: in combination with a housing, a driving shaft journaled in said housing, a driven shaft journaled in said housing, and interengaging torque limiting friction means connecting said driven shaft to said driving shaft, the maximum torque transmissible between said shafts being determined by the pressure of interengagement of said friction means, the provision of: a fixed sleeve surrounding one of said shafts; an adjustable thrust unit axially movable along said sleeve and engageable with said friction means for varying the pressure of interengagement thereof; clutch release means for moving said thrust unit; and selectively operable locking means for locking said thrust unit either in engagement with said fixed sleeve for applying pressure to said friction means or in engagement with said clutch release means for releasing said pressure; said thrust unit comprising a sleeve slidably disposed on said fixed sleeve and movable by said clutch release means, a slidable member slidable along said fixed sleeve, compression spring means interposed between said slidable member and said slidable sleeve and capable of yieldably urging the latter and the slidable member apart, a device for adjusting the thrust exerted by said compression spring means, and means movable with said slidable member for applying the pressure of said compression spring means to said friction means, said slidable sleeve being locked by said locking means.

References Cited in the file of this patent

UNITED STATES PATENTS

| 413,569 | Sherman | Oct. 22, 1889 |
| 1,077,354 | Lemay | Nov. 4, 1913 |
| 1,158,555 | Prescott | Nov. 2, 1915 |
| 1,164,531 | Kwis | Dec. 14, 1915 |
| 1,305,029 | Tibbetts | May 27, 1919 |
| 1,340,885 | Fuller | May 25, 1920 |
| 1,379,891 | Aichele | May 31, 1921 |
| 1,500,960 | Regan | July 8, 1924 |
| 1,535,238 | Miller | Apr. 28, 1925 |
| 1,697,595 | Henderson | Jan. 1, 1929 |
| 1,928,301 | Pierson | Sept. 26, 1933 |
| 2,123,744 | Ramsey | July 12, 1938 |
| 2,457,801 | Ball | Jan. 4, 1949 |

FOREIGN PATENTS

| 86,613 | Switzerland | Sept. 16, 1920 |
| 334,245 | Italy | June 23, 1936 |